(12) United States Patent
Hsu et al.

(10) Patent No.: US 10,811,720 B2
(45) Date of Patent: Oct. 20, 2020

(54) BATTERY CELL TRAY

(71) Applicant: CHROMA ATE INC., Tao-Yuan (TW)

(72) Inventors: Hsu-Chang Hsu, Tao-Yuan (TW);
Kuo-Yen Hsu, Tao-Yuan (TW)

(73) Assignee: CHROMA ATE INC., Tao-Yuan (TW)

( * ) Notice: Subject to any disclaimer, the term of this patent is extended or adjusted under 35 U.S.C. 154(b) by 0 days.

(21) Appl. No.: 16/278,741

(22) Filed: Feb. 19, 2019

(65) Prior Publication Data
US 2019/0305352 A1  Oct. 3, 2019

(30) Foreign Application Priority Data

Mar. 30, 2018 (TW) .............................. 107111371 A

(51) Int. Cl.
*H01M 10/04* (2006.01)
(52) U.S. Cl.
CPC .............................. *H01M 10/0404* (2013.01)
(58) Field of Classification Search
CPC .......... H01M 10/0404; H01M 10/049; H01M 2/0217; H01M 10/0413; H01M 2/1077; H01M 10/0481
See application file for complete search history.

(56) References Cited

U.S. PATENT DOCUMENTS

2005/0281002 A1* 12/2005 Miller ................. H01M 10/627
361/716
2018/0205110 A1  7/2018 Yuk et al.

FOREIGN PATENT DOCUMENTS

| JP | 60-100699 U | 7/1985 |
|---|---|---|
| JP | WO2011/111153 A1 | 6/2013 |
| JP | 2013-165039 A | 8/2013 |
| JP | 2015-037047 A | 2/2015 |
| KR | 10-2004-0034534 A | 4/2004 |
| KR | 10-1482042 B1 | 1/2015 |

* cited by examiner

*Primary Examiner* — Cynthia K Walls
(74) *Attorney, Agent, or Firm* — CKC & Partners Co., LLC

(57) ABSTRACT

A battery cell tray includes a bottom plate, a top plate opposite the bottom plate, at least one partition plate between the bottom plate and the top plate, a pressing plate between the partition plate and the bottom plate, and a transmission device between the pressing plate and the bottom plate and on the bottom plate. The transmission device includes moving members, a spiral rod, and supporting arms. The moving members respectively have a first threaded hole and a second threaded hole. The spiral rod has a first screw thread and a second screw thread that are arranged in reverse rotation directions and respectively engaged with the first threaded hole and the second threaded hole. Two top ends of the supporting arms are pivoted to the pressing plate, and two bottom ends of the supporting arms are respectively pivoted to the moving members.

8 Claims, 5 Drawing Sheets

BATTERY CELL TRAY

RELATED APPLICATIONS

This application claims priority to Taiwan Application Serial Number 107111371, filed Mar. 30, 2018, which are herein incorporated by reference.

BACKGROUND

Field of Invention

The present invention relates to a battery cell tray. More particularly, the present invention relates to a battery cell tray used for battery cell formation.

Description of Related Art

The battery cell formation is, after cell manufacturing, via exciting positive and negative charge substances inside the battery by some charge/discharge method, improving charge-discharge, self-discharge and energy-saving capability.

In the process of battery cell formation, the composition of the cell interfaces could be kept by suitable mechanical stress, and it could prevent active substance layered and strained. The suitable mechanical stress could be provided by a battery cell formation constraint tray. A traditional battery cell formation constraint tray is constructed by the use of rotating spiral rod, which is protruded through the bottom plate, to adjust the position of the bottom plate. It could shorten the length between the bottom plate and the top plate, and the cell between those two plates would be compressed.

In this way, however, to rotate the spiral rod connected with the bottom plate, the reserved spiral rod portion protruded through the bottom plate is required. This causes not only large torque but also space waste. Furthermore, it is also inconvenient in the process of compressing or decompressing the cell, wherein the spiral rod should be screwed in or out of the bottom plate.

SUMMARY

An aspect of the present invention is a battery cell tray.

According to an embodiment of the present invention, a battery cell tray includes a bottom plate, a top plate, at least one partition plate, a pressing plate, and a transmission device. The top plate is disposed opposite the bottom plate. The partition plate is located between the bottom plate and the top plate to support a cell. The pressing plate is located between the partition plate and the bottom plate. The transmission device is located between the pressing plate and the bottom plate. The transmission device includes a pair of moving members, a spiral rod, and a pair of supporting arms. The moving members are located on the bottom plate, and respectively have a first threaded hole and a second threaded hole. The spiral rod has a first crew thread and a second screw thread that are arranged in reverse rotation directions and respectively engaged with the first threaded hole and the second threaded hole. The supporting arms intersect with each other. Two top ends of the supporting arms are pivoted to the pressing plate, and two bottom ends of the supporting arms are respectively pivoted to the moving members. When the spiral rod rotates, the moving members are close to or away from each other, such that the supporting arms drive the pressing plate to be close to or away from the top plate.

In one embodiment of the present invention, the battery cell tray includes a plurality of connectors. Two ends of each connector are fixed to the bottom plate and the top plate respectively.

In one embodiment of the present invention, the partition plate has a plurality of guiding portions. The connectors respectively pass through the guiding portions.

In one embodiment of the present invention, the pressing plate has a plurality of guiding portions. The connectors respectively pass through the guiding portions.

In one embodiment of the present invention, the moving members have at least one roller, and the roller is located on the bottom plate.

In one embodiment of the present invention, a lengthwise direction of the spiral rod is substantially perpendicular to the normal line of the pressing plate.

In one embodiment of the present invention, when the pressing plate is close to the top plate, an included angle between the each of supporting arms and the horizontal line is in the range from 45 degrees to 90 degrees.

In one embodiment of the present invention, the battery cell tray includes a clamp and a bearing. The clamp is located on the bottom plate, positioning one end of the spiral rod to drive the spiral rod to rotate. The bearing is located on the bottom plate, accommodating one end disposed opposite the clamp.

In one embodiment of the present invention, an edge of the partition plate has concave portions. The cell on the partition plate is packaged by a sealing pouch. The concave portions do not overlap the cell, and the sealing pouch is located in the concave portions and is exposed by the concave portion.

In one embodiment of the present invention, hardness of the pressing plate, the top plate, and the bottom plate are greater than hardness of the partition plate.

In aforementioned embodiments of the present invention, the transmission device has a pair of moving members, the spiral rod, and a pair of supporting arms, the pair of moving members respectively has a first threaded hole and a second threaded hole, and the spiral rod has a first screw thread and a second screw thread that are arranged in reverse rotation directions and respectively engaged with the first threaded hole and the second threaded hole. Therefore, when the spiral rod rotates, the pair of moving members can be close to or away from each other. As a result, when the moving members are close to each other, the pair of supporting arms drive the pressing plate to be close to the top plate, thereby compressing the cell on the partition plate. When the moving members are away from each other, the pair of supporting arms drive the pressing plate to be away from the top plate, decompressing the cell on the partition plate. The spiral rod of the transmission device of the battery cell tray is not required to protrude from the bottom plate, and thus the battery cell tray could save space, and the supporting arms which intersect with each other could provide effort-saving for a force applied to the pressing plate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
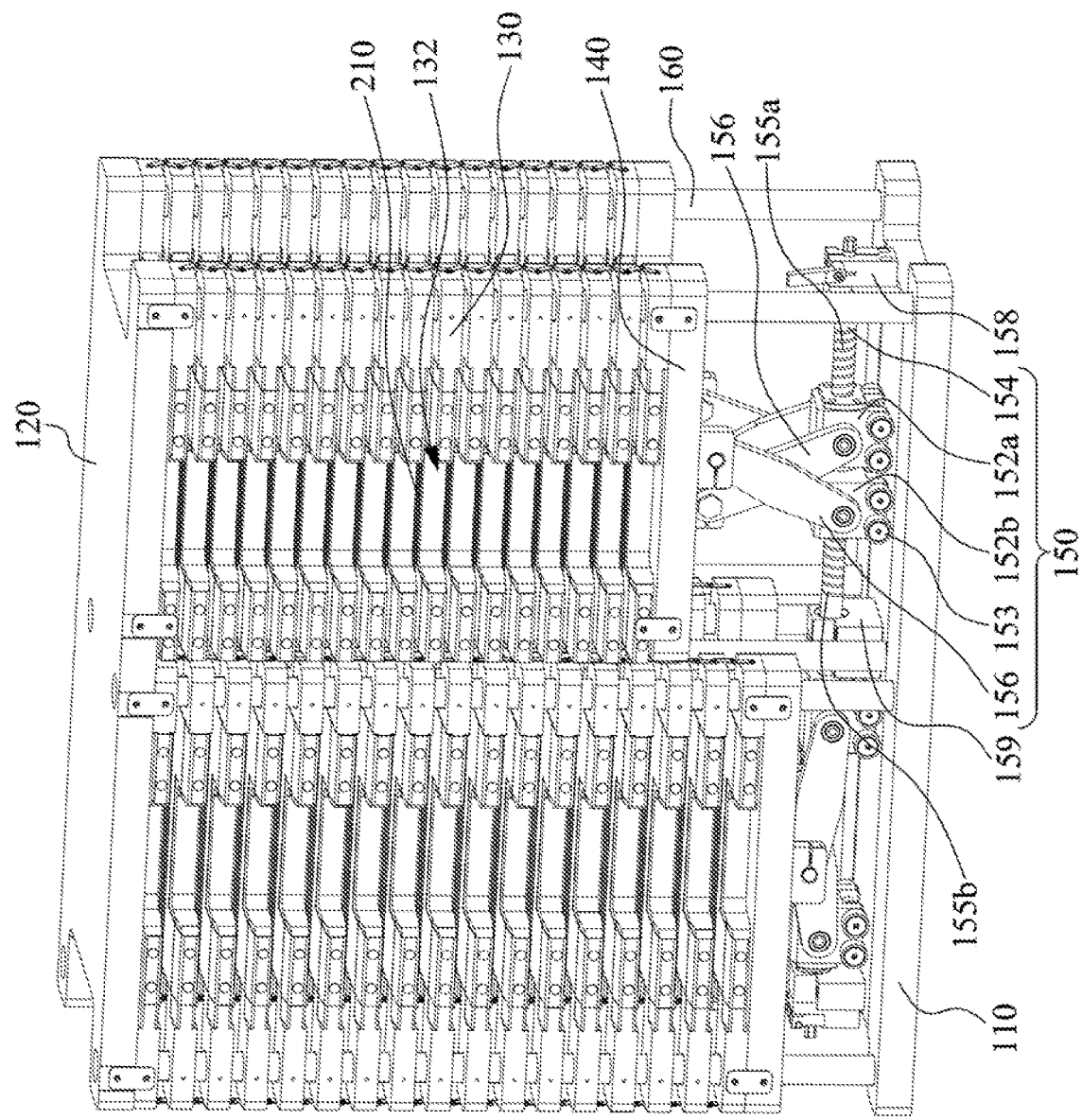
FIG. 1 is a perspective of a battery cell tray according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a perspective of a battery cell tray 100 according to one embodiment of the present invention. As shown in FIG. 1, the battery cell tray 100 includes a bottom plate 110, a top plate 120, a partition plate 130, a pressing plate 140, and a transmission device 150. The top plate 120 is disposed opposite the bottom plate 110. The partition plate 130 is located between the bottom plate 110 and the top plate 120, to support a cell 210. The cell 210 may be a to-be formation cell, but the present invention is not limited in this regard. The pressing plate 140 is located between the partition plate 130 and the bottom plate 110. In this embodiment, the bottom plate 110, the top plate 120, the partition plate 130, and the pressing plate 140 are substantially parallel.

Furthermore, the transmission device 150 is located between the pressing plate 140 and the bottom plate 110. The transmission device 150 includes a pair of moving members 152a, 152b, a spiral rod 154, and a pair of supporting arms 156. The pair of moving members 152a and 152b are located on the bottom plate 110. The pair of supporting arms 156 intersect with each other. Two top ends of the pair of supporting arms 156 are pivoted to the pressing plate 140, and two bottom ends of the pair of supporting arms 156 are respectively pivoted to the moving members 152a and 152b. The pair of the supporting arms 156 may be regarded as a scissors structure, which may be used to lift and to lower the pressing plate 140.

When the pressing plate 140 rises, the length between the pressing plate 140 and the top plate 120 is shortened, such that the cell 210 between the top plate 120 and the bottom plate 140 is compressed to start a battery formation step, in which the configuration is shown in the right part of the battery cell tray 110 of FIG. 1. When the pressing plate 140 goes down, the length between the pressing plate 140 and the top plate 120 is increased, such that the cell 210 between the top plate 120 and the bottom plate 140 is decompressed to pull out the cell 210 or place the cell 210, in which the configuration is shown in the left part of the battery cell tray 110 of FIG. 1.

In this embodiment, the hardness of the pressing plate 140, the top plate 120, and the bottom plate 110 are greater than hardness of the partition plate 130. For example, the pressing plate 140, the top plate 120, and the bottom plate 110 may be made of a material including metals, which may bear two tons of force. The partition plate 130 may be made of a material including plastic, but the present invention is not limited in this regard.

In the following description, structure designs about how the transmission device 150 to drive the pressing plate 140 to be close to or away from the top plate 120 will be explained.

Figure 2:
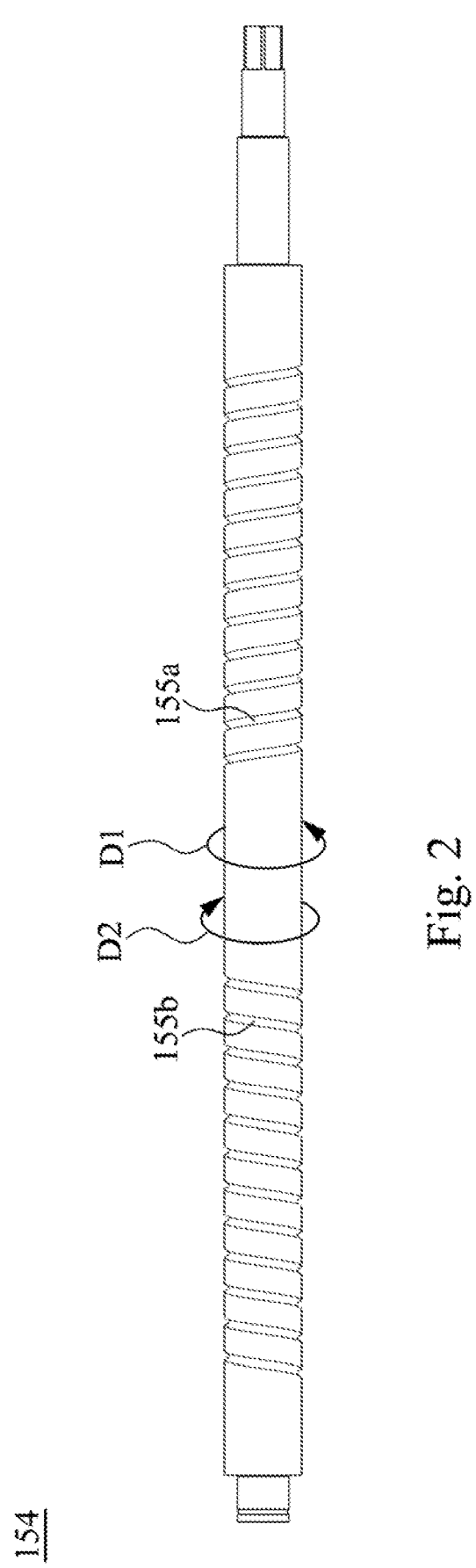
FIG. 2 is a front view of a spiral rod shown in FIG. 1.
Figure 3:
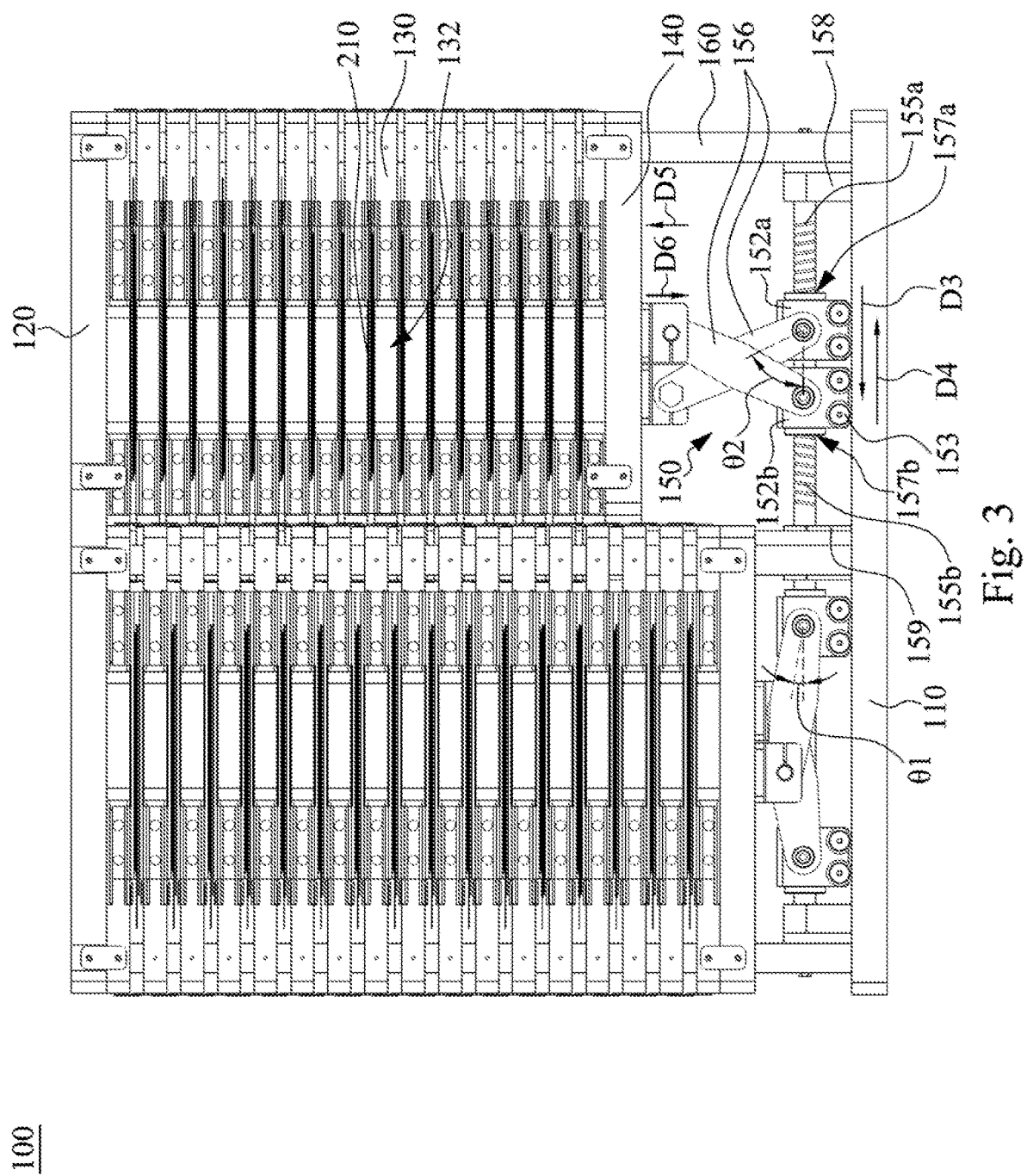
FIG. 3 is a front view of the battery cell tray shown in FIG. 1, in which the battery cell tray is in use.

FIG. 2 is a front view of the spiral rod 154 shown in FIG. 1. FIG. 3 is a front view of the battery cell tray 100 shown in FIG. 1, in which the battery cell tray 100 is in use. As shown in FIG. 2 and FIG. 3, the spiral rod 154 has a first screw thread 155a and a second screw thread 155b that are arranged in reverse rotation directions. The spiral rod 154 can rotate in a direction D1 or direction D2. The moving member 152a has a first threaded hole 157a, and the moving member 152b has a second threaded hole 157b. The first screw thread 155a of the spiral rod 154 is engaged with the first threaded hole 157a of the moving member 152a, and the second screw thread 155b of the spiral rod 154 is engaged with the second threaded hole 157b of the moving member 152b.

In this design, when the spiral rod 154 rotates, the moving member 152a and 152b are close to or away from each other, such that the supporting arms 156 drive the pressing plate 140 to be close to or away from the top plate 120. For example, when the spiral rod 154 rotates in the direction D1, the moving member 152a moves in a direction D3 and the moving member 152b moves in the direction D4, and thus the moving members 152a and 152b are close to each other. Furthermore, when the spiral rod 154 rotates in the direction D2, the moving member 152a moves in a direction D4 and the moving member 152b moves in the direction D3, and thus the moving members 152a and 152b are away from each other.

As a result, when the moving members 152a and 152b are close to each other, the supporting arms 156 which are pivoted to the pressing plate 140 and the moving member 152a and 152b can drive the pressing plate 140 to be close to the top plate 120 in a direction D5, thereby compressing the cell 210 on the partition plate 130. When the moving members 152a and 152b are away from each other, the supporting arms 156 can drive the pressing plate 140 to be away from the top plate 120 in a direction D6, thereby decompressing the cell 210 on the partition plate 130. The spiral rod 154 of the transmission device 150 of the battery cell tray 100 is not required to penetrate through the bottom plate 110 to protrude, such that space may be save. In addition, the supporting arms 156 intersecting with each other can provide effort-saving for a force applied to the pressing plate 140.

When an included angle $\theta 1$ between the supporting arms 156 and a horizontal line is less than 45 degrees, because the supporting arms 156 are the scissors structure, the supporting arms 156 can raise the pressing plate 140 fast, thereby saving time. At this time, the cell 210 is not compactly compressed yet, and thus a force applied by the supporting arms 156 is not required. When the included angle $\theta 2$ between the supporting arms 156 and a horizontal line is in the range from 45 degrees to 90 degrees, because the supporting arms 156 are the scissors structure, the supporting arms 156 may provide a larger force applied to the cell 210, thereby saving the effort for applied force. At this time, the cell 210 has been compactly compressed, and thus rapidly raising the pressing plate 140 by the supporting arms 156 is not required.

In this embodiment, a lengthwise direction of the spiral rod 154, such as the direction D3, is substantially perpendicular to the normal line of the pressing plate 140, such as the direction D5. As a result, it can ensure that the spiral rod 154 during rotating is always located between the bottom plate 110 and the pressing plate 140, and the spiral rod 154 is not required to penetrate through the bottom plate 110. Therefore, storage space for the battery cell tray 100 may be saved.

In addition, the moving members 152a and 152b may further have rollers 153 located on the bottom plate 110, such that the moving members 152a and 152b can move on the bottom plate 110 by the rollers 153. In this embodiment, the battery cell tray 100 may further have a clamp 158 and a bearing 159, in which the clamp 158 is located on the bottom plate 110, and the clamp 158 positions one end of the spiral rod 154. The bearing 159 is located on the bottom plate 110, and accommodates one end of the spiral rod 154 facing away from the clamp 158. In this design, when a motor or other transmission devices connect the spiral rod 154 at the outer side of the clamp 158, the spiral rod 154 can be driven to rotate in the bearing 159, such that the moving members 152a and 152b are close to or away from each other. In this embodiment the clamp 158 can improve the stability of the rotating spiral rod 154.

It should be understood that the connection relationships of the elements and materials described above will not be repeated. In the following description, structures of the pressing plate 140 and the partition plate 130 of the battery cell tray 100 will be explained.

Figure 4:
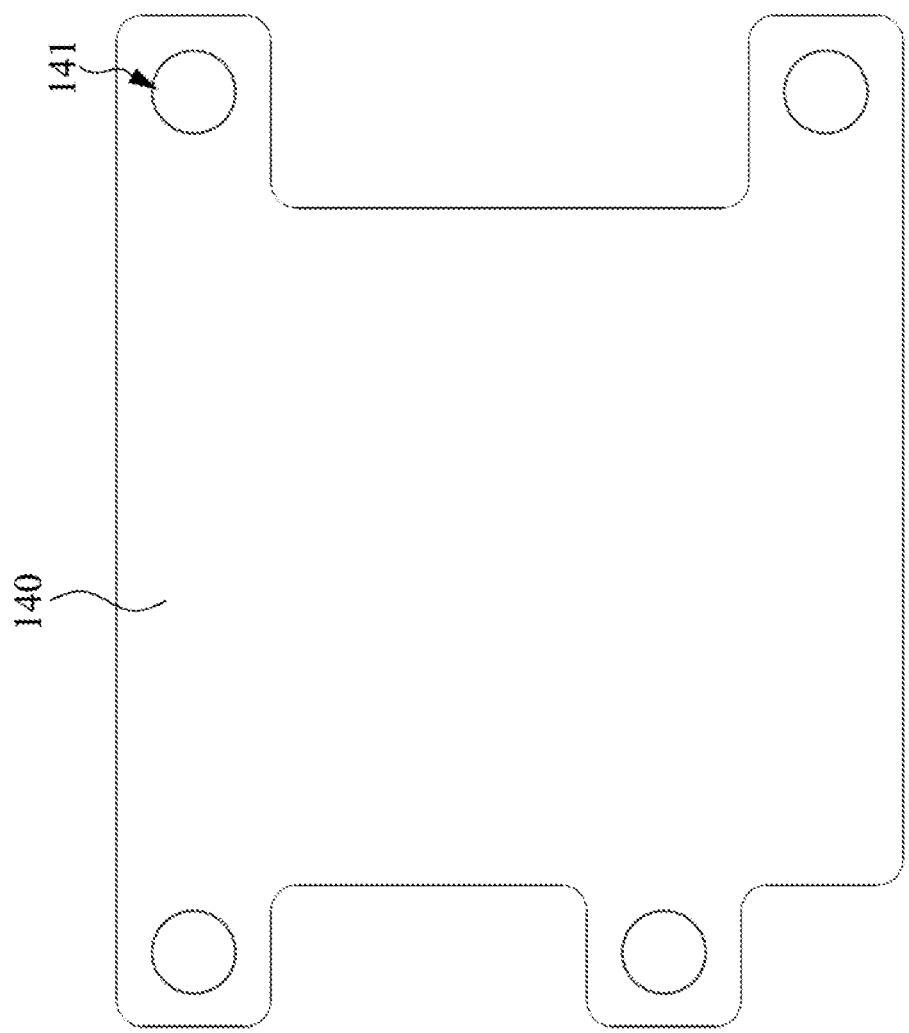
FIG. 4 is a top view of a pressing plate shown in FIG. 3.

FIG. 4 is a top view of the pressing plate 140 shown in FIG. 3. As shown in FIG. 3 and FIG. 4, the battery cell tray 100 includes a plurality of connectors 160. Two ends of each of the connectors 160 are respectively fixed to the bottom plate 110 and the top plate 120. The pressing plate 140 has a plurality of guiding portions 141. The connectors 160 respectively pass through the guiding portions 141 of the pressing plate 140. For example, the guiding portions 141 may be perforations, but not limited to through holes. As a result, the pressing plate 140 can be on the on the connectors 160 and move in the direction D5 or direction D6.

Figure 5:
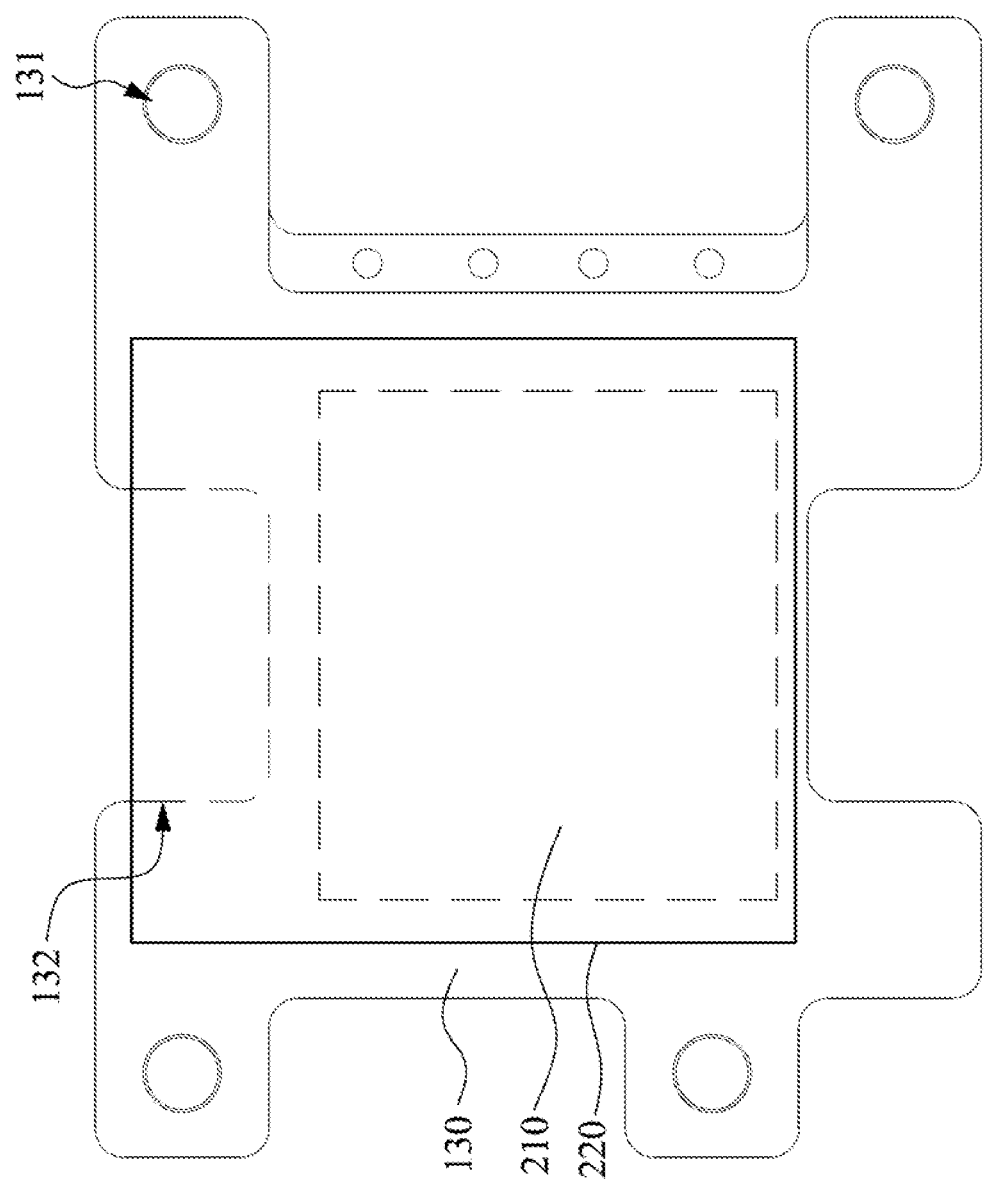
FIG. 5 is a top view of a partition plate shown in FIG. 3, in which the partition plate supports a pouch cell.

FIG. 5 is a top view of the partition plate 130 shown in FIG. 3, in which the partition plate 130 supports a pouch cell. As shown in FIG. 3 and FIG. 5, the partition plate 130 has a plurality of guiding portions 131. The connectors 160 respectively pass through the guiding portions 131 of the partition plate 130. For example, the guiding portions 131 may be but not limited to through holes. As a result, the partition plate 130 can be on the connectors 160 and move in the direction D5 or D6. When the pressing plate 140 is close to the top plate 120 in the direction D5, the partition 130 plate is also close to the top plate 120 in the direction D5 along with the pressing plate 140, thereby compressing the cell 210. When the pressing plate 140 is away from the top plate 120 in the direction D6, the partition plate 130 is also away from the top plate 120 in the direction D6 along with the pressing plate 140, thereby decompressing the cell 210.

In this embodiment, the edge of the partition plate 130 has concave portions 132. The number of the concave portions 132 could be two, and the two concave portions are respectively formed at the two opposite edges of the partition plate 130, but the present invention is not limited in this regard. In some embodiments, the cell 210 on the partition plate 130 may be packaged by the sealing pouch 220, thereby forming the pouch type cell.

When the pouch cell is placed on the partition plate 130, the concave portion 132 of the partition plate 130 does not overlap the cell 210, and a portion of the sealing pouch 220 is located in the concave portion 132 and is exposed by the concave portion 132. In this design, when the supporting arms 156 drive the pressing plate 140 to be close to the top plate 120, because the pouch cell is compressed, the gas generated by battery cell formation in the pouch 220 can be extruded to the region which is not covered by the partition plate 130, and the pouch 220 in the concave portion 132 can expand due to the collecting of the gas. In this state, suitable tools may be used to seal and cut the expanded pouch 220 adjacent to the concave 132, and the pouch cell without the gas can be obtained.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A battery cell tray, comprising:
   a bottom plate;
   a top plate above the bottom plate;
   a plurality of connectors, wherein two ends of each of the connectors are respectively fixed to the bottom plate and the top plate;
   at least one partition plate located between the bottom plate and the top plate to support a cell, wherein the partition plate has a plurality of guiding portions, and the connectors respectively pass through the guiding portions;
   a pressing plate located between the partition plate and the bottom plate; and
   a transmission device located between the pressing plate and the bottom plate, and comprising:
      a pair of moving members located on the bottom plate and respectively have a first threaded hole and a second threaded hole;
      a spiral rod having a first screw thread and a second screw thread that are arranged in reverse rotation directions and respectively engaged with the first threaded hole and the second threaded hole; and
      a pair of supporting arms intersecting with each other, wherein two top ends of the pair of supporting arms are pivoted to the pressing plate, and two bottom ends of the pair of supporting arms are respectively pivoted to the pair of moving members, wherein when the spiral rod rotates, the moving members are close to or away from each other, such that the pair of supporting arms drive the pressing plate to be close to or away from the top plate.

2. The battery cell tray of claim 1, wherein the pressing plate has a plurality of guiding portions, and the connectors respectively pass through the guiding portions.

3. The battery cell tray of claim 1, wherein the moving member has at least one roller, and the roller is located on the bottom plate.

4. The battery cell tray of claim 1, wherein a lengthwise direction of the spiral rod is substantially perpendicular to a normal line of the pressing plate.

5. The battery cell tray of claim 1, wherein when the pressing plate is close to the top plate, an included angle between each of the pair of supporting arms and a horizontal line is in the range from 45 degrees to 90 degrees.

6. The battery cell tray of claim 1, comprising:
   a clamp located on the bottom plate, and positioning one end of the spiral rod to drive the spiral rod to rotate; and
   a bearing located on the bottom plate, and accommodating one end of the spiral rod facing away from the clamp.

7. The battery cell tray of claim 1, wherein an edge of the partition plate has a concave portion, the cell on the partition plate is packaged by a sealing pouch, the concave portion does not overlap the cell, and a portion of the sealing pouch is located in the concave portion and is exposed by the concave portion.

8. The battery cell tray of claim 1, wherein hardness of the pressing plate, the top plate, and the bottom plate are greater than hardness of the partition plate.

* * * * *